(12) United States Patent
Knittel

(10) Patent No.: US 8,351,316 B2
(45) Date of Patent: Jan. 8, 2013

(54) BEAM SHAPER FOR AN OPTICAL STORAGE SYSTEM

(75) Inventor: Joachim Knittel, Tuttlingen (DE)

(73) Assignee: Thomson Licensing (FR)

( * ) Notice: Subject to any disclaimer, the term of this patent is extended or adjusted under 35 U.S.C. 154(b) by 362 days.

(21) Appl. No.: 12/215,096

(22) Filed: Jun. 25, 2008

(65) Prior Publication Data

US 2009/0010136 A1 Jan. 8, 2009

(30) Foreign Application Priority Data

Jul. 2, 2007 (EP) ...................................... 07111524

(51) Int. Cl.
*G11B 7/00* (2006.01)

(52) U.S. Cl. .................................. 369/112.16
(58) Field of Classification Search .................. None
See application file for complete search history.

(56) References Cited

U.S. PATENT DOCUMENTS

| | | | |
|---|---|---|---|
| 6,625,102 B1 * | 9/2003 | Hashimoto | ............ 369/112.16 |
| 6,654,183 B2 | 11/2003 | Coufal et al. | |
| 6,987,592 B2 | 1/2006 | Tsukagoshi | |
| 7,375,887 B2 * | 5/2008 | Hansen et al. | ............ 359/485.05 |
| 2002/0021652 A1 * | 2/2002 | Takasuka et al. | ........ 369/112.24 |
| 2002/0191236 A1 | 12/2002 | King | |
| 2005/0007930 A1 * | 1/2005 | Horimai et al. | ............... 369/103 |
| 2006/0274393 A1 | 12/2006 | Fotheringham | |
| 2007/0121469 A1 | 5/2007 | Torii | |

FOREIGN PATENT DOCUMENTS

| | | |
|---|---|---|
| CN | 1542496 | 11/2004 |
| CN | 1808215 | 7/2006 |
| JP | 2006185474 A * | 7/2006 |
| JP | 2007149253 | 6/2007 |
| KR | 100308009 | 8/2001 |
| WO | WO2006/056949 | 6/2006 |

OTHER PUBLICATIONS

Search report dated Aug. 24, 2007.
Jian Jim Wang, "Innovative nano-optical deveces, integration and nano-fabrication technologies", Proceedings of SPIE, vol. 5623 (2005) pp. 259.
Sarun Sumriddetchkajorn, "A High Resolution Mirror-based Digitally controlled Optical Beam Shaper", Electro Optice Section, National Electronics and Computer Technology Center Pathumthani, Thailand, 2003.
Juan Liu, Laser beam shaping with polarization-selective diffractive phase elements, Applied Optics, vol. 39, No. 18, Jun. 20, 2000.

* cited by examiner

*Primary Examiner* — Joseph Haley
(74) *Attorney, Agent, or Firm* — Jack Schwartz and Associates, PLLC

(57) ABSTRACT

A beam shaper has a beam shaping element with an optical property that varies spatially over the profile of an incoming light beam in order to generate a first shaped light beam from the incoming light beam.

13 Claims, 4 Drawing Sheets

BEAM SHAPER FOR AN OPTICAL STORAGE SYSTEM

This application claims the benefit, under 35 U.S.C. §119 of EP Patent Application 07111524.0, filed Jul. 2, 2007.

FIELD OF THE INVENTION

The present invention relates to an apparatus for reading from and/or writing to optical storage media, such as holographic storage media, and more specifically to a beam shaper for use in such an apparatus.

BACKGROUND OF THE INVENTION

In holographic data storage digital data are stored by recording the interference pattern produced by the superposition of two coherent laser beams, where one beam, the so-called 'object beam', is modulated by a spatial light modulator and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam.

One advantage of holographic data storage is an increased data capacity. Contrary to conventional optical storage media, the volume of the holographic storage medium is used for storing information, not just a single or few 2-dimensional layers. One further advantage of holographic data storage is the possibility to store multiple data in the same volume, e.g. by changing the angle between the two beams or by using shift multiplexing, etc. Furthermore, instead of storing single bits, data are stored as data pages. Typically a data page consists of a matrix of light-dark-patterns, i.e. a two dimensional binary array or an array of grey values, which code multiple bits. This allows to achieve increased data rates in addition to the increased storage density. The data page is imprinted onto the object beam by the spatial light modulator (SLM) and detected with a detector array.

Typical laser diodes emit elliptical beams with Gaussian intensity distribution. This leads to inhomogeneous power distribution on the spatial light modulator that produces the data pages in a holographic storage system. To improve the signal to noise ratio of the data page, and thereby the capacity, a homogeneous intensity distribution is preferable. The elliptical distribution can be eliminated easily, for example by using a prism pair. The Gaussian distribution can be reduced by special optics with aspheric surfaces. However, beam-shaping optics are expensive and extremely sensitive to misalignment.

For example, U.S. Pat. No. 6,654,183 describes a system for converting a substantially non-uniform optical input beam, such as a Gaussian beam, to a substantially uniform output beam. For this purpose the system has two optical elements with aspheric surfaces arranged in either a Keplerian or Galilean configuration.

SUMMARY OF THE INVENTION

It is an object of the invention to propose a simple solution for a beam shaper for use in an apparatus for reading from and/or writing to optical storage media.

According to the invention, this object is achieved by a beam shaper for generating a first shaped light beam from an incoming light beam, which has a beam shaping element with an optical property that varies spatially over the profile of the incoming light beam. The spatially varying optical property allows to easily convert an incoming intensity distribution into a desired intensity distribution, e.g. a Gaussian distribution into a nearly flat top distribution. At the same time the beam shaper is relatively insensitive to small misalignments.

Advantageously, the beam shaping element has a spatially variable reflectivity. For example, the reflectivity of the beam shaping element may decrease from the center of the beam shaping element towards the edge of the beam shaping element. In this way a central intensity peak of the incoming light beam is flattened in a light beam transmitted through the beam shaping element.

Alternatively, the beam shaping element has a spatially variable influence on the polarization of the incoming light beam. For example, the beam shaping element may have local wave plates, such as half wave plates, with a spatially variable orientation relative to a direction of polarization of the incoming light beam. This allows to modify the local polarization of a transmitted beam. By sending the resulting light beam through a polarizing beam splitter or a polarization dependent beam block, or onto a polarization dependent mirror, the intensity distribution of the transmitted beam can be modified as desired.

The above solutions are likewise suitable for transforming an elliptical intensity distribution into a rotationally symmetric intensity distribution. It is sufficient to adapt the spatial variation of the optical property to the specific intensity distribution. However, in this case the beam shaper becomes more sensitive to misalignments.

According to a further aspect of the invention, a method for generating a first shaped light beam from an incoming light beam has the step of modifying a beam profile of the incoming light beam with a beam shaping element having an optical property that varies spatially over the profile of the incoming light beam. For example, the beam profile is modified by locally changing the intensity or the polarization.

Advantageously, a beam splitter is provided for generating a second shaped light beam from the incoming light beam. The beam splitter preferably directs that part of the incoming light beam, that is not used for the first shaped light beam, out of the optical path of the first shaped light beam. In case of a beam shaping element with spatially variable reflectivity, the light beam reflected by the beam shaping element favorably constitutes the second shaped light beam.

Preferably, the beam splitter is a polarizing beam splitter. This is especially advantageous if the beam shaping element has a spatially variable influence on the polarization of the incoming light beam. In this case the polarizing beam splitter separates the first shaped light beam and the second shaped light beam simply in accordance with their directions of polarization. However, a polarizing beam splitter is likewise useful in combination with a beam shaping element with spatially variable reflectivity. In this case a quarter wave plate is favorably provided for rotating the direction of polarization of the light beam reflected by the beam shaping element.

Favorably, a beam shaper according to the invention is used in an apparatus for reading from and/or writing to optical storage media. Of course, the beam shaper is likewise advantageous in any other optical setup where a shaped light beam has to be generated from an incoming light beam. This has the advantage that the desired intensity distribution of the shaped light beam is obtained in a very simple way. In addition, as the beam shaper is relatively insensitive to small misalignments, the overall alignment of the optical setup is simplified.

A second shaped light beam is advantageously generated from the incoming light beam by a beam splitter. For example, in an apparatus for reading from and/or writing to holographic storage media, the first shaped beam and the second shaped beam are used as an object beam and a reference beam, respectively. In this way the object beam and the reference beam are generated in an energy efficient way. As in holographic data storage the data rate is currently limited by the available laser power, this leads to an increase of the achievable data rate. In addition, the signal to noise ratio is significantly increased if an incoming Gaussian intensity distribution is converted into a nearly flat top distribution.

Preferably, an apparatus for reading from and/or writing to optical storage media, e.g. holographic storage media, has a beam shaper according to the invention for shaping a light beam.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

In the following the invention is explained with reference to an apparatus for reading from and/or writing to holographic storage media. Of course, the invention is not limited to such an application.

Figure 1:
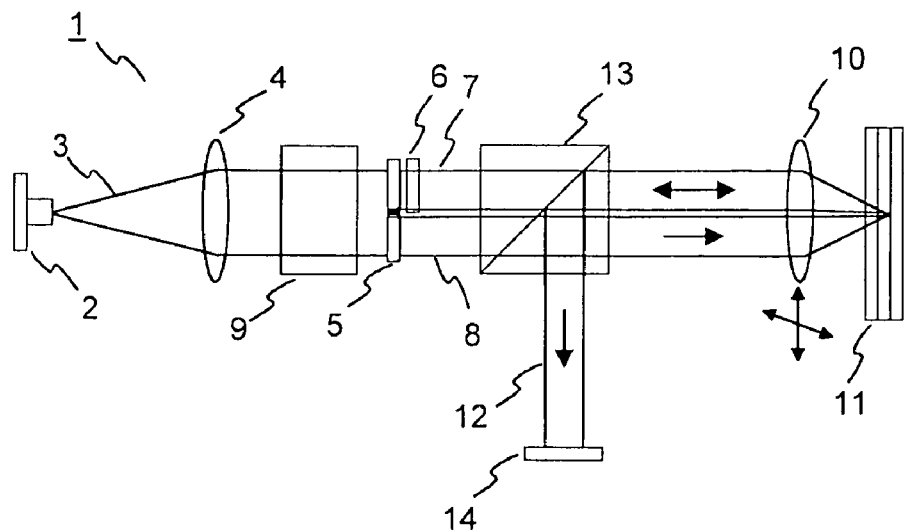
FIG. 1 shows an exemplary setup of an apparatus for reading from and/or writing to holographic storage media, FIG. 2 schematically depicts a first example of a beam shaper according to the invention using a partially reflective mirror.

In holographic data storage digital data are stored by recording the interference pattern produced by the superposition of two coherent laser beams. An exemplary setup of an apparatus 1 for reading from and/or writing to holographic storage media is shown in FIG. 1. A source of coherent light, e.g. a laser diode 2, emits a light beam 3, which is collimated by a collimating lens 4. The light beam 3 is then divided into two separate light beams 7, 8. In the example the division of the light beam 3 is achieved using a first beam splitter 5. However, it is likewise possible to use other optical components for this purpose. A spatial light modulator (SLM) 6 modulates one of the two beams, the so called "object beam" 7, to imprint a 2-dimensional data pattern. Both the object beam 7 and the further beam, the so called "reference beam" 8, are focused into a holographic storage medium 11, e.g. a holographic disk, by an objective lens 10. At the intersection of the object beam 7 and the reference beam 8 an interference pattern appears, which is recorded in a photo-sensitive layer of the holographic storage medium 11. A beam shaper 9 is provided for converting the Gaussian intensity distribution of the light beam 3 emitted by the laser diode 2 into a nearly flat top intensity distribution.

The stored data are retrieved from the holographic storage medium 11 by illuminating a recorded hologram with the reference beam 8 only. The reference beam 8 is diffracted by the hologram structure and produces a copy of the original object beam 7, the reconstructed object beam 12. This reconstructed object beam 12 is collimated by the objective lens 10 and directed onto a 2-dimensional array detector 14, e.g. a CCD-array, by a second beam splitter 13. The array detector 14 allows to reconstruct the recorded data.

Figure 2:
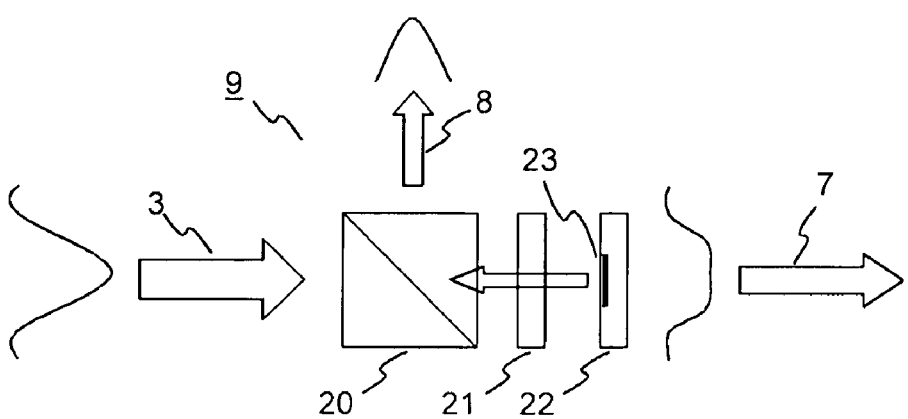

In FIG. 2 a first example of a beam shaper 9 according to the invention is shown. In this example the beam shaper 9 is used for generating an object beam 7 and a reference beam 8 as the first shaped light beam and the second shaped light beam, respectively. A linear polarized laser beam 3 with a circular Gaussian intensity distribution is send through a polarizing beam splitter (PBS) 20 and a quarter-wave plate 21 onto a partially reflective mirror 22. The reflectivity distribution of the partially reflective mirror 22 is chosen such that in the center 23 the reflectivity is high, preferably >50%, whereas towards the border the reflectivity decreases to a low value, preferably close to 0%. This attenuates the central intensity peak of incoming laser beam 30 and thereby flattens the intensity distribution. A partially reflective mirror 22 with such a reflectivity distribution can easily be produced by controlled sputtering of a reflective layer. The transmitted beam serves as the object beam 7. The reflected light is send again through the quarter-wave plate 21, in order to rotate the polarization by 90°, and reflected by the PBS 20. This beam is used as the reference beam 8 for the holographic storage system 1.

In FIG. 2 a polarizing beam splitter (PBS) 20 and a quarter-wave plate 21 are used to generate the reference beam 8 in addition to the object beam 7. Of course, the reference beam may likewise be generated in a different way, e.g. by deflecting part of the incoming light beam 3 with a beam splitter prior to beam shaping. In this case the light reflected by the partially reflective mirror 22 is not used. As an alternative, the partially reflective mirror 22 may be slightly inclined relative to the incoming light beam 3. In this way the reflected light is directed out of the path of the incoming light beam 3 so that it is sufficient to provide a mirror for generating the reference beam 8.

Figure 3:
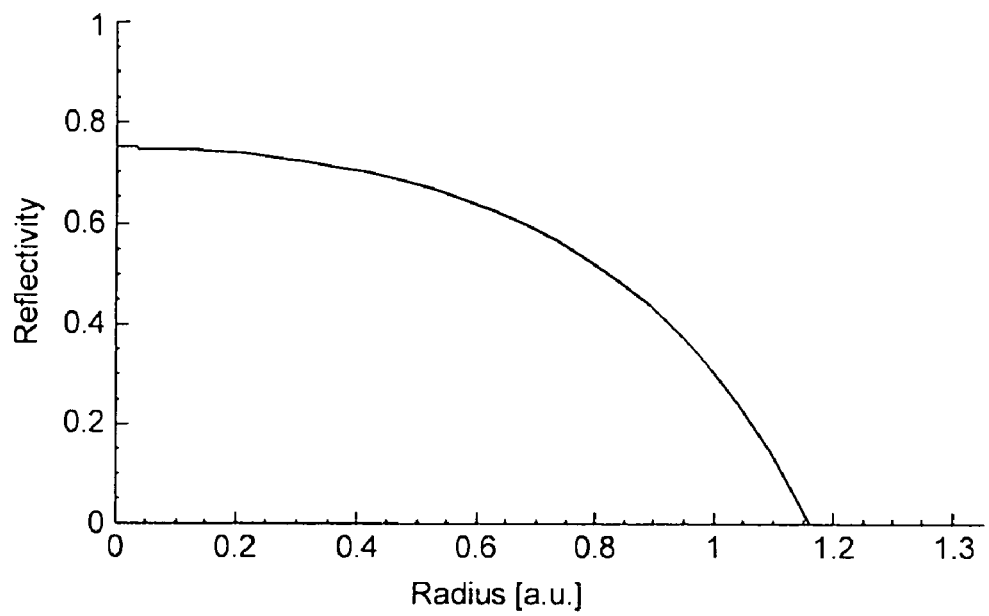
FIG. 3 depicts the reflectivity of the partially reflective mirror of FIG. 2.
Figure 4:
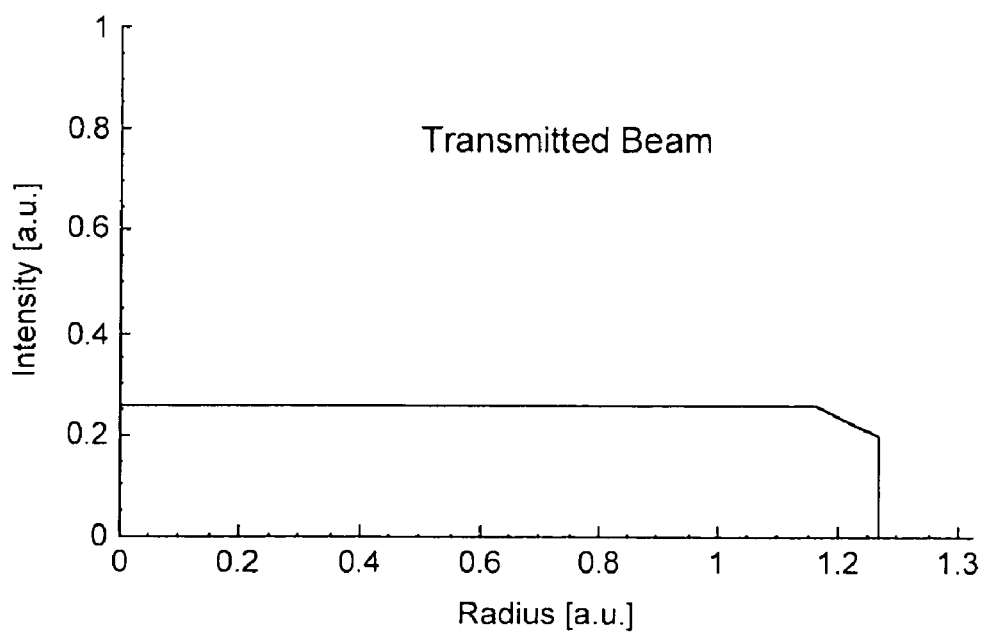
FIG. 4 shows the resulting intensity distribution of the first shaped light beam.
Figure 5:
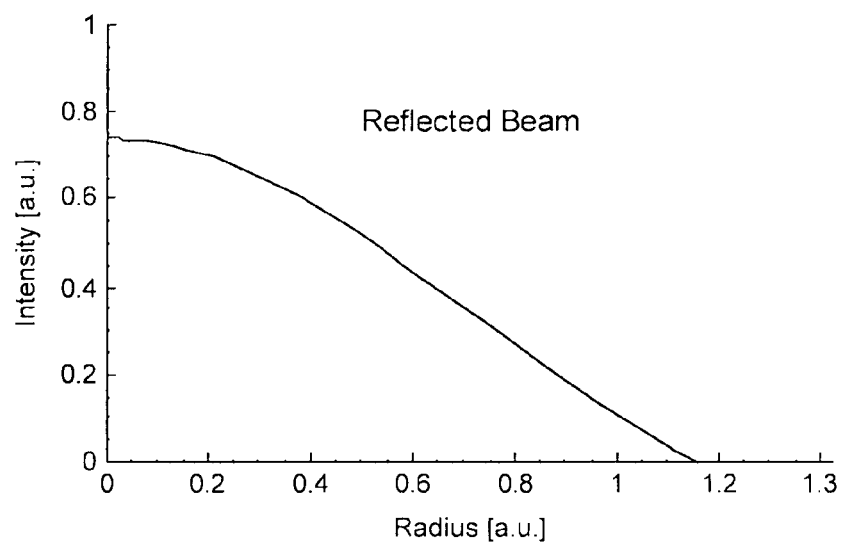
FIG. 5 shows the resulting intensity distributions of the second shaped light beam.

FIG. 3 illustrates an exemplary reflectivity distribution of the partially reflective mirror 22. FIGS. 4 and 5 show the resulting intensity distributions (1-dimensional) of the object beam 7 and the reference beam 8, respectively. It is to be noted that the beams are circular. Therefore, the areas of the reference beam 8 and the object beam 7 do not need to be equal to achieve equal power.

The incoming beam 3 has an intensity distribution of $\text{Exp}(-r^2)$. It is only used up to a radius $r=1.268$, so that 80% of the total power is used. The partially reflective mirror 22 has a reflectivity distribution $R(r)=1-0.26\,\text{Exp}(r^2)$ for $r \leq 1.16$ and $R(r)=0$ for $r>1.16$. With this reflectivity distribution the intensity distributions shown in FIGS. 4 and 5 is obtained for the object beam 7 and the reference beam 8. The beams 7, 8 have equal power, which results in a high contrast of the recorded holograms. In addition, the object beam 7 has a nearly flat top intensity distribution, although 80% of the totally available energy is used.

Figure 6:
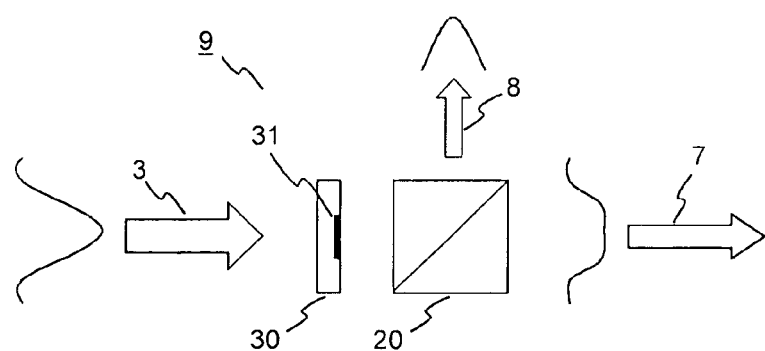
FIG. 6 depicts a second example of a beam shaper according to the invention using a diffractive optical element, FIG. 7 schematically illustrates the properties of the diffractive optical element of FIG. 5.

FIG. 6 illustrates a second embodiment of a beam shaper 9. This embodiment uses a diffractive optical element (DOE) 30 with polarizing sub-wavelength structures 31 to generate a flat top object beam 7. In this case the incoming laser beam 3 has to be polarized (linear or circular). Recently it has been shown that wave plates, e.g. halve-wave plates, can be realized with sub-wavelength structures. See, for example, J. J. Wang et al.: "Innovative nano-optical devices, integration and nano-fabrication technologies", Proc. of SPIE, Vol. 5623 (2005), pp. 259. These structures can be replicated in a cheap mass production process. By placing such structures 31 on a glass substrate 32 and locally rotating them, the local polarization of a transmitted beam is modified. This is depicted schematically in FIG. 7. By sending the resulting light beam through a polarizing beam splitter 20, the intensity distribution of the transmitted beam 7, 8 can be modified at will. The structures 31 can likewise be placed directly on the polarizing beam splitter 20 to make the system even more compact.

Figure 7:
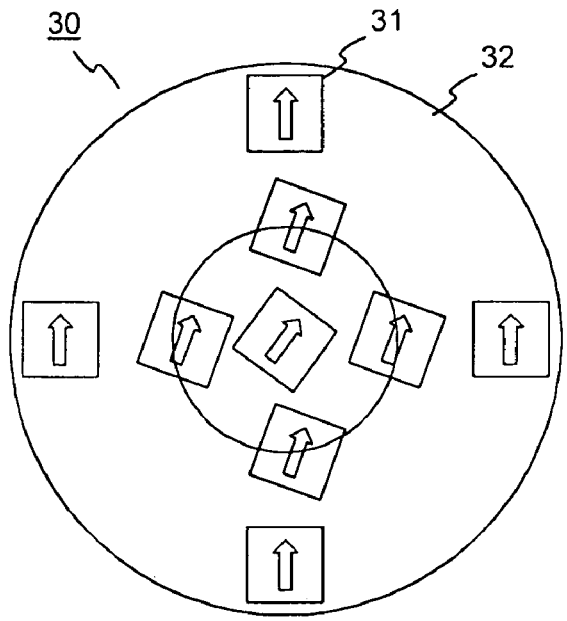

FIG. 7 schematically illustrates the properties of the DOE 30. The arrows represent the direction of the local halve-wave plate structures 31. The rotation angles change from the inside to the outside. As a consequence the amount of light transmitted by the polarizing beam splitter 20 changes over the diameter of the beam and the intensity distribution is modified.

In the above embodiments a circular Gaussian intensity distribution was assumed. Of course, the invention is likewise applicable to other types of intensity distributions, e.g. an elliptical Gaussian distribution or a non-Gaussian distribution. It is sufficient to adapt the varying property, e.g. the reflectivity or the influence on the polarization, to the specific intensity distribution. Likewise, the output profile is not limited to a nearly flat top profile. Other profiles can likewise be generated.

Figure 8:
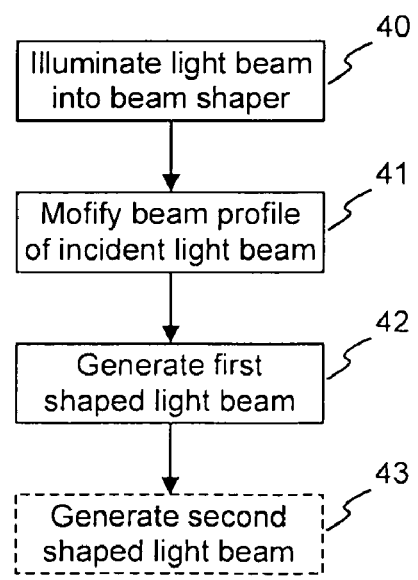
FIG. 8 illustrates a method according to the invention for generating a first shaped light beam from an incoming light beam.

A method according to the invention for generating a first shaped light beam 7 from an incoming light beam 3 is schematically illustrated in FIG. 8. In a first step 40 an incoming light beam 3 is illuminated into a beam shaper 9. A beam shaping element 22, 30 with an optical property that varies spatially over the profile of the incoming light beam 3 than modifies 41 the beam profile of the incoming light beam 3, e.g. by locally changing the intensity or the polarization of the incoming light beam 3. Subsequently the first shaped light beam 7 is generated 42, e.g. by transmitting the modified beam profile or by reflecting a part of the modified beam profile with a polarizing beam splitter 20. Optionally, as indicated by the dashed rectangle, a second shaped light beam 8 is generated 42, e.g. by using the remainder of the incoming light beam 3 that is not used for the first shaped light beam 7.

What is claimed is:

1. A beam shaper for generating a first shaped light beam from an incoming light beam, wherein the beam shaper comprises a beam shaping element with an influence on a polarization of the incoming light beam that varies spatially in two dimensions over the profile of the incoming light beam, wherein along each radius from a center of the beam shaping element to an edge of the beam shaping element the influence on the polarization varies continuously from a first value in the center of the beam shaping element to a second value at the edge of the beam shaping element.

2. The beam shaper according to claim 1, wherein the beam shaping element comprises local wave plates with a spatially variable orientation relative to a direction of polarization of the incoming light beam.

3. The beam shaper according to claim 2, wherein the local wave plates are half wave plates.

4. The beam shaper according to claim 1, further comprising a beam splitter for generating a second shaped light beam from the incoming light beam.

5. The beam shaper according to claim 4, wherein the beam splitter is a polarizing beam splitter.

6. The beam shaper according to claim 5, further comprising a quarter wave plate for rotating the direction of polarization of a light beam coming from the beam shaping element.

7. An apparatus for reading from or writing to optical storage media, with a light source for generating a light beam, wherein the apparatus comprises a beam shaper for generating a first shaped light beam from the light beam, the beam shaper comprising a beam shaping element with an influence on a polarization of the light beam that varies spatially in two dimensions over the profile of the light beam, wherein along each radius from a center of the beam shaping element to an edge of the beam shaping element the influence on the polarization varies continuously from a first value in the center of the beam shaping element to a second value at the edge of the beam shaping element.

8. The apparatus according to claim 7, further comprising a beam splitter for generating a second shaped light beam from the light beam.

9. The apparatus according to claim 7, wherein it is adapted to read from or write to holographic storage media.

10. The apparatus according to claim 9, wherein the first shaped light beam and the second shaped light beam are an object beam and a reference beam.

11. An optical setup, wherein the optical setup comprises a beam shaper for generating a first shaped light beam from an incoming light beam, the beam shaper comprising a beam shaping element with an influence on a polarization of the incoming light beam that varies spatially in two dimensions over the profile of the incoming light beam, wherein along each radius from a center of the beam shaping element to an edge of the beam shaping element the influence on the polarization varies continuously from a first value in the center of the beam shaping element to a second value at the edge of the beam shaping element.

12. An optical setup, wherein the optical setup comprises a beam shaper for generating a first shaped light beam and a second shaped light beam from an incoming light beam, the beam shaper comprising a beam splitter and a beam shaping element with an influence on a polarization of the incoming light beam that varies spatially in two dimensions over the profile of the incoming light beam, wherein along each radius from a center of the beam shaping element to an edge of the beam shaping element the influence on the polarization varies continuously from a first value in the center of the beam shaping element to a second value at the edge of the beam shaping element.

13. A method for generating a first shaped light beam from an incoming light beam, the method comprising the step of locally changing a polarization of the incoming light beam with a beam shaping element with an influence on the polarization of the incoming light beam that varies spatially in two dimensions over the profile of the incoming light beam, wherein along each radius from a center of the beam shaping element to an edge of the beam shaping element the influence on the polarization varies continuously from a first value in the center of the beam shaping element to a second value at the edge of the beam shaping element.

* * * * *